United States Patent [19]

Asano et al.

[11] Patent Number: 5,690,290
[45] Date of Patent: Nov. 25, 1997

[54] FISHING REEL HANDLE FIXING STRUCTURE

[75] Inventors: Shinichi Asano; Shigeo Mimura; Takeo Miyazaki, all of Tokyo, Japan

[73] Assignee: Daiwa Seiko, Inc., Tokyo, Japan

[21] Appl. No.: 789,818

[22] Filed: Jan. 27, 1997

Related U.S. Application Data

[63] Continuation of Ser. No. 344,679, Nov. 21, 1994, abandoned.

[30] Foreign Application Priority Data

Nov. 24, 1993 [JP] Japan ................. 5-067306 U
Sep. 28, 1994 [JP] Japan ................. 6-233555

[51] Int. Cl.$^6$ .................. A01K 89/01; A01K 89/015
[52] U.S. Cl. ............................ 242/283; 74/545
[58] Field of Search .................. 242/283, 310; 74/617, 545; 16/121; 403/10; 411/429, 431, 372, 373, 374, 377, 910

[56] References Cited

U.S. PATENT DOCUMENTS

| | | |
|---|---|---|
| 2,189,654 | 2/1940 | Rief . |
| 2,307,747 | 1/1943 | Pflueger ............... 411/429 X |
| 3,989,204 | 11/1976 | Lemery ............... 242/283 X |
| 4,037,489 | 7/1977 | Morel ............... 74/545 X |
| 4,422,600 | 12/1983 | Preston ............... 242/310 X |
| 4,777,775 | 10/1988 | Verble ............... 411/431 X |
| 4,842,009 | 6/1989 | Reback ............... 16/121 X |
| 4,927,095 | 5/1990 | Young ............... 242/261 |
| 5,112,175 | 5/1992 | Wilkening ............... 411/377 X |
| 5,131,596 | 7/1992 | Sato ............... 242/279 |
| 5,275,352 | 1/1994 | Sato ............... 242/310 X |
| 5,308,019 | 5/1994 | Karlsson ............... 242/310 X |
| 5,529,255 | 6/1996 | Asano et al. ............... 242/283 X |
| 5,538,198 | 7/1996 | Hirano et al. ............... 242/283 |

FOREIGN PATENT DOCUMENTS

| | | |
|---|---|---|
| 5108873 | 7/1980 | Japan . |
| 374266 | 7/1991 | Japan . |
| 2261147 | 5/1993 | United Kingdom . |

*Primary Examiner*—Daniel P. Stodola
*Assistant Examiner*—William A. Rivera
*Attorney, Agent, or Firm*—Longacre & White

[57] ABSTRACT

A fishing reel which prevents fingers against damage even if they accidentally touch a loosening preventive member (9) during the winding operation of a handle (5), prevents a bait, dust and the like from sticking to the loosening preventive member as much as possible, and prevents a fishline from getting twined around the loosening preventive member (9). The handle (5) is threadedly fixed to the end portion of a drive shaft (4) by a threaded member (35), and the loosening preventive member (9) for preventing the threaded member 35 from loosening is fixed to the handle (5). The surface of the loosening preventive member (9), which is to be mounted to the upper surface (5a) of the handle (5), extending from the peripheral edge portion of the member (9) to the central portion thereof is formed in a smooth surface (9a).

7 Claims, 8 Drawing Sheets

FISHING REEL HANDLE FIXING STRUCTURE

This is a continuation of application Ser. No. 08/344,679, filed Nov. 21, 1994, which was abandoned upon the filing hereof.

BACKGROUND OF THE INVENTION

The present invention relates to a fishing reel in which a handle is threadedly fixed to the end portion of a drive shaft adapted to drive a spool for taking up or winding a fishline, by use of a threaded member.

Conventionally, a handle to be mounted to the end portion of a drive shaft is fastened and fixed by a nut to which is mounted a loosening preventive member for preventing the nut from loosening. As examples of such loosening preventive member for preventing the loosening of the nut, there are disclosed in Japanese Utility Model Kokai Publication No. Sho. 55-108873 and Japanese Utility Model Kokai Publication No. Hei. 3-74266 loosening preventive members which are respectively mounted and fixed to the handle in such a manner that they project out from the upper surface of the handle.

The loosening preventive members disclosed in the above-mentioned publications are both so structured as to project from the upper surface of the handle and, therefore, fingers may accidentally touch the loosening preventive member and be damaged during the winding operation of the handle. Further, the slime of fish, a bait, dust and the like are easy to stick to the loosening preventive member. Furthermore, a fishline may be entwined or tangled around the loosening preventive member.

SUMMARY OF THE INVENTION

In view of the problems found in the conventional fishing reel, it is an object of the invention to provide an arrangement for a fishing reel, which prevents fingers against damage even if they accidentally touch a loosening preventive member during the winding operation of a handle, prevents a bait, dust and the like from attaching to the loosening preventive member as much as possible, and prevents a fishline from being entwined around the loosening preventive member so that pleasant fishing can be realized.

In order to attain the above-noted and other objects, according to the invention, there is provided a fishing reel in which a handle is threadedly fixed by a threaded member to the end portion of a drive shaft to drive a spool for winding and a loosening preventive member to prevent the threaded member from loosening is fixed to the handle, characterized in that the surface of the loosening preventive member extending from the peripheral edge portions thereof to the central portion thereof is formed in a smooth shape.

Also, according to the invention, there is provided a fishing reel in which a handle is threadedly fixed by use of a threaded member to the end portion of a drive shaft to drive a spool for winding and a loosening preventive member to prevent the threaded member from loosening is fixed to the handle, characterized in that a cover member to cover the loosening preventive member is fixed to the upper surface of the handle and also the surface of the loosening preventive member extending from the peripheral edge portions thereof to the central portion thereof is formed in a smooth shape.

According to the invention, the loosening preventive member to be mounted to the upper surface of the handle is structured such that the surface thereof extending from the peripheral edge portions thereof to the central portion thereof is formed in a smooth shape in order to prevent a fishline, a finger, a bait and the like from getting caught on the loosening preventive member when the fishing reel is operated. Or, a cover member is so fixed to the upper surface of the handle as to cover the loosening preventive member and the cover member is structured such that the surface thereof extending from the peripheral edge portion thereof to the central portion thereof is formed in a smooth shape in order to prevent a fishline, a finger, bait and the like from getting caught on the loosening preventive member when the fishing reel is operated.

DETAILED DESCRIPTION OF THE PREFERRED EMBODIMENTS

Figure 1:
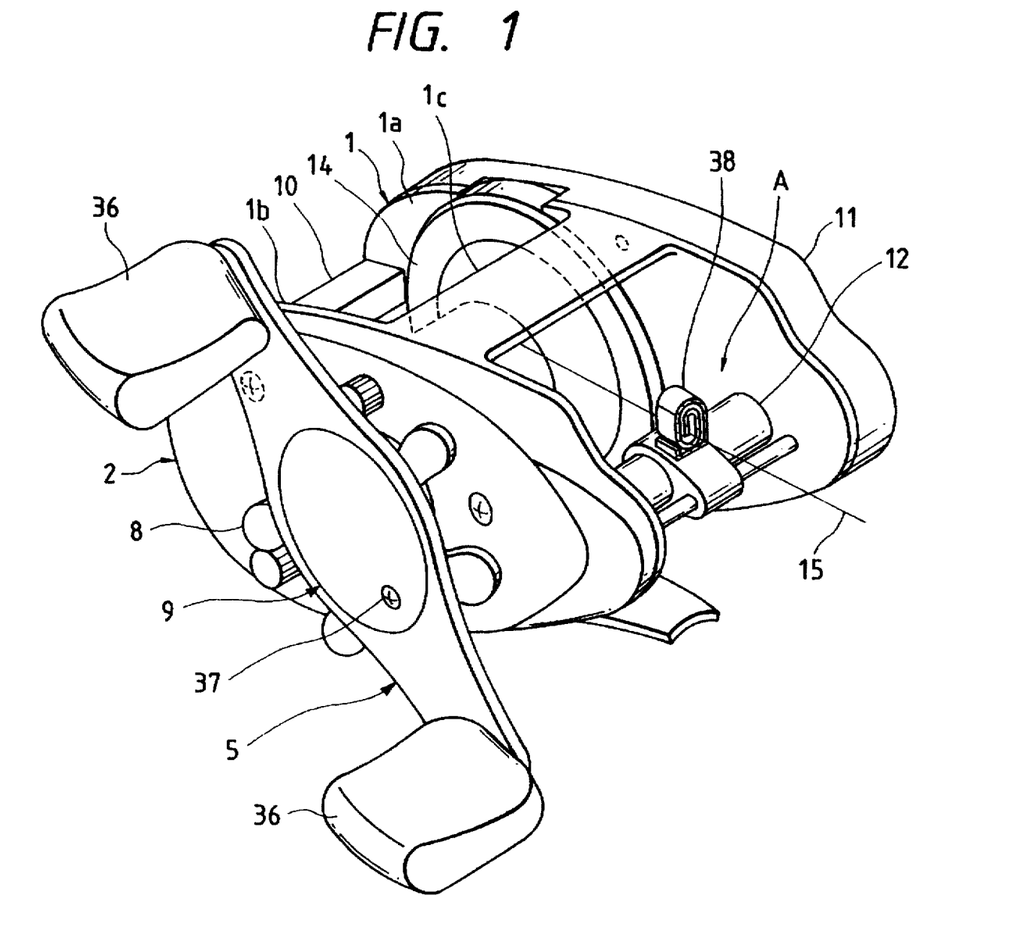
FIG. 1 is a perspective view of a first embodiment of the invention, in which a dual bearing type fishing reel is used as a fishing reel.
Figure 2:
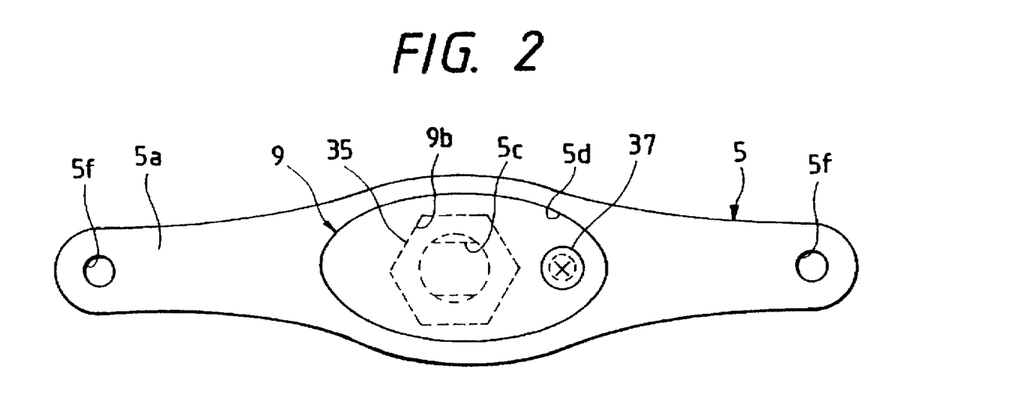
FIG. 2 is a plan view of a handle portion shown in FIG. 1.
Figure 3:
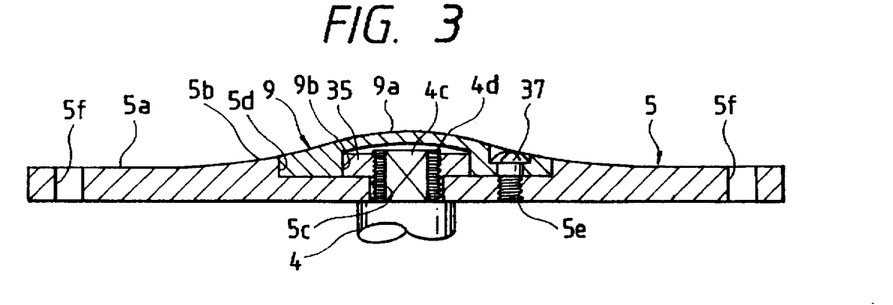
FIG. 3 is a sectional side view of the handle portion shown in FIG. 1.
Figure 4:
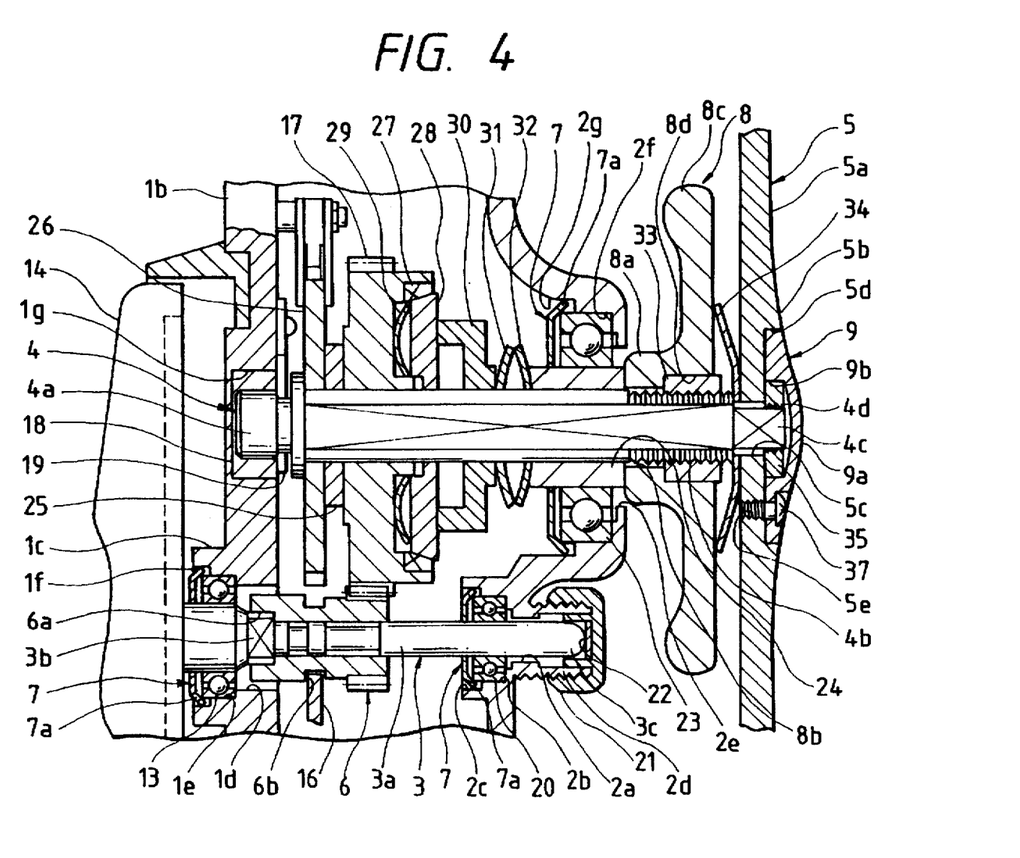
FIG. 4 is an enlarged sectional plan view of the main portions of the dual bearing type reel shown in FIG. 1.

Now, description will be given below of embodiments of a fishing reel according to the invention. In particular, FIGS. 1 through 4 respectively show a first embodiment of a fishing reel according to the invention. In the description of the embodiments of the invention, as a fishing reel, there is used a dual bearing type reel. Specifically, FIG. 1 is a perspective view of a dual bearing type reel, FIG. 2 is a plan view of a handle portion of the dural bearing type reel, FIG. 3 is a sectional side view of the handle portion, and FIG. 4 is an enlarged sectional plan view of the main portions of the dual bearing reel shown in FIG. 1.

A reel main body 1 includes two right and left side frames 1a and 1b which are held in parallel to each other by a plurality of support members 10 and a hold plate 1c. And, reel side plates 11 and 2 are respectively mounted to the outsides of the side frames 1a and 1b. The two end portions of a guide cylinder 12 provided in a fishline guide device A are respectively mounted to the two side frames 1a and 1b by means of structures (not shown) in such a manner that they are prevented against rotation. Also, a spool shaft 3 is rotatably supported on the two side frames 1a and 1b through bearings (only one bearing 13 is shown in FIG. 4) and the spool shaft 3. The spool shaft 3 can be rotated by a handle 5 mounted to a drive shaft 4 through a clutch mechanism and a gear train mechanism. A spool 14, which is to be interposed between the two right and left side frames 1a and 1b, is fixed to the spool shaft 3 and a fishline 15 is wound around the outer periphery of the fishline winding barrel of the spool shaft 3.

Between the right side plate 1b located on the right of the bearing 13 and the small diameter portion 3a of the spool shaft 3, there is fitted a pinion 6 in such a manner that it is free to move in the axial direction thereof. The spool shaft 3 includes an engaging portion 3b, while the pinion 6 includes an engaging portion 6a. Engagement and disengagement between the engaging portions 3b and 6a is executed by a clutch plate 16 fitted into a peripheral groove 6b formed in the pinion 6. That is, the clutch mechanism is made up of the engaging portion 3b of the spool shaft 3, the engaging portion 6a of the pinion 6, and the clutch plate 16 fitted into the peripheral groove 6b of the pinion 6. Also, a drive gear 17 rotatably fitted with the drive shaft 4 is in mesh with the pinion 6.

A shaft cylinder portion 1c is projectingly formed on the left inner side of the right side frame 1b and a through hole 1d and recessed portions 1e, 1f are formed inside the shaft cylinder portion 1c. The bearing 13 is fitted into and mounted to the recessed portion 1e, a tongue piece 7a of a hold member 7 is secured into the recessed portion 1f, and thus the bearing 13 is prevented against removal by the hold member 7. On the other hand, a recessed portion 1g is formed on the right outer side of the right side frame 1b, a bearing 18 is fitted into the recessed portion 1g, and one end 4a of the drive shaft 4 is also rotatably fitted into the recessed portion 1g and is prevented against removal by a removal preventive plate 19.

The reel side plate 2 includes a through hole 2a and recessed portions 2b, 2c. A bearing 20 is fitted into and mounted to the recessed portion 2b, the tongue piece 7a of the hold member 7 is secured into the recessed portion 2c, and thus the bearing 20 is prevented against removal by the hold member 7. The other end 3c, which has a small diameter, of the spool shaft 3 is supported on the bearing 20. Also, on the right outer side of the reel side plate 2, there is projectingly provided a shaft cylinder portion 2d which includes an external thread on the outer periphery thereof. With the external thread of the shaft cylinder portion 2d, there is threadedly engaged a cover knob 21 with a thrust bearing 22 fixed to the inner bottom surface thereof, while the other end 3c having a small diameter of the spool shaft 3 is in contact with the thrust bearing 22.

The reel side plate 2 further includes a through hole 2e and recessed portions 2f, 2g. A bearing 23 is fitted into and mounted to the recessed portion 2f and a tongue piece 7a of a hold member 7 having the same shape as the above-mentioned hold member 7 is secured into the recessed portion 2g, so that the bearing 23 is prevented against removal by the hold member 7. On the bearing 23, there is supported the drive shaft through a collar 24 which is fitted with the drive shaft 4 in such a manner that it is free to move in the axial direction of the drive shaft 4 but is prevented against rotation.

A friction plate 25 is fitted with the portion of the drive shaft 4 located on the left of a drive gear 17 which is rotatably fitted with the drive shaft 4 and, a ratchet wheel 26 is non-rotatably fitted at the left side of the friction plate 25 with the drive shaft 4. And, a friction plate 27 is fixed to the right side of the drive gear 17 and a friction disk 28 is non-rotatably fitted with the drive shaft 4 in such a manner as to be abutted against the friction plate 27. A curved spring 29 is inserted between the drive gear 17 and friction plate 28 and a pressure board 30, which is fitted with the drive shaft 4 in a rotation preventive manner, is abutted against the right side of the friction disk 28. Springs 31, 32, which are prevented against rotation by the drive shaft 4, are abutted against the right side of the pressure board 30 and the collar 24 is in contact with the right side of the spring 32. An engaging portion 8a of an adjust member 8 is in contact with the right side of the collar 24. The above-mentioned friction plate 27, friction disk 28, curved springs 31, 32, collar 24 cooperate in forming a brake mechanism.

The above mentioned adjust member 8 includes the engaging portion 8a in contact with the collar 24, a central through hole 8b, an operation portion 8c which can be rotationally operated by fingers, and a polygonal fitting recessed portion 8d formed in the central portion of the adjust member 8. A nut 33, which is threadedly engaged with an external thread portion 4b of the drive shaft 4, is fitted into the polygonal fitting recessed portion 8d. The drive shaft 4 includes a rotation preventive portion 4c and an external thread portion 4d in the other end portion thereof that is located on the right of the nut 33. And, a pressure spring 34 and the handle 5 are fitted with the rotation preventive portion 4c in such a manner that they are respectively prevented against rotation with respect to the drive shaft 4, and also they are prevented against removal by a threaded member 35 which, in this embodiment, is a nut.

The above-mentioned fishline guide device A includes a guide barrel 12, a slider 38 which slides right and left on the outer peripheral of the guide barrel 12, and a traverse cam shaft (not shown) stored in the guide barrel 12. The traverse cam shaft can be rotated by rotationally operating the handle 5. Also, while the engaging portion 3b of the spool shaft 3 is clutch-connected with the engaging portion 6a of the pinion 6 due to the operation of the clutch plate 16, if the handle 5 is rotationally operated, then the spool shaft 3 with the spool 14 mounted thereto is rotated through the drive shaft 4 and gear train mechanism. As a result of this, if the handle 5 is rotationally operated such that the fishline can be taken up, then the fishline can be wound uniformly around the spool 14 or the like by means of the sliding operation of the fishline guide device A. The rotational operation of the handle 5 can be performed by gripping one of handle knobs 36 which are rotatably journaled in respective through holes 5f formed in the end portions of the handle 5.

Next, description will be given below in detail of the structure of a connecting portion between the handle 5 and drive shaft 4. In the handle 5, as shown in FIGS. 2 and 3, there is formed a curved surface 5b so that the central area of the upper surface 5a of the handle 5 can be expanded upwardly, and an elliptical recessed portion 5d is formed in the expanded portion. A substantially oval-shaped through hole 5c (having circular portions and straight portions as illustrated by dotted line in FIG. 2) is formed in the central portion of the recessed portion 5d, and a screw hole 5e is formed in the neighborhood of the oval through hole 5c. The above-mentioned rotation preventive portion 4c provided in the other end portion of the drive shaft 4 is fitted into the oval through hole 5c, whereby the handle 5 can be mounted to the drive shaft in such a manner that it is prevented against rotation. An external thread portion 4d is formed in the outer peripheral portion of the rotation preventive portion 4c and the threaded member 35 (i.e. a nut) can be threadedly engaged with the external thread portion 4d. As a result of this, the handle 5 can be fastened and fixed to the drive shaft 4 in such a manner that it is prevented against rotation.

A loosening preventive member 9, which is used to prevent the screw member 35 from loosening, is engaged with the screw member 35. The loosening preventive member 9 is structured as a cover including an elliptical outer shape so that the loosening preventive member 9 can be fitted into an elliptical recessed portion 5d formed in the central area of the upper surface 5a of the handle 5. And, the loosening preventive member 9 includes on the back surface thereof a recessed portion 9b which can be put on the screw member 35 to prevent the loosening of the threaded member 35. The loosening preventive member 9 can be fixed to the handle 5 by threadedly engaging a screw 37 with the threaded hole 5e.

Also, the loosening preventive member 9 includes a curved surface 9a which expands upwardly in a range extending from the peripheral edge portions of the member 9 to the central portion thereof. Thus, if the loosening preventive member 9 is fixed to the handle 5, then there can be formed a smooth surface which continues with the curved surface 5b of the handle 5, as shown in FIG. 3. In this manner, since the smooth surface continuing with the curved surface 5b of the handle 5 is formed, there is eliminated the possibility that a bait, fingers, dust, or the fishline can be caught in the member 9.

Concretely describing, according to the fishing reel the handle portion of which is structured in the above manner, since the loosening preventive member 9 is mounted and fixed in such a manner that it does not project out greatly from the upper surface 5a of the handle 5 and it forms a relatively flat, smooth outer surface, unlike the conventional fishing reel, when the handle 5 is wound quickly, or when fingers happen to slip from the knob 36 due to the water or oil stuck thereto, even if the fingers accidentally touch the neighboring portion of the loosening preventive member 9, the fingers are prevented against damage and a safe and smooth winding operation is possible. Also, the present fishing reel prevents the slime of fish, bait, dust and the like from sticking to the loosening preventive member 9 as much as possible and, even if such things stick to the member 9, they can be wiped off very easily so that the present fishing reel can realize pleasant fishing. Further, since the handle 5 and loosening preventive member 9 provide a unified shape as a whole, the present fishing reel is improved in design as well.

Especially, as in the present embodiment, the loosening preventive member 9 is mounted within the recessed portion 5d formed in the upper surface of the handle 5 so that the upper surface 5a of the handle 5 and the upper surface of the loosening preventive member 9 provide a substantially level and continuous shape without having any stepped portions, whereby it is possible not only to prevent the fishline from being twined but also to prevent fingers from being damaged as much as possible in the peripheral edge portion of the loosening preventive member. Also, since the securing part (in the present embodiment, the screw 37) for fixing the loosening preventive member to the upper surface of the handle is structured such that it does not project from the surface of the loosening preventive member, it is possible to prevent the slime of fish, bait, dust and the like from sticking to the handle more positively.

Next, description will be given below of other embodiments of a fishing reel according to the invention. In each of the embodiments to be described below, only the handle portion thereof is shown.

Figure 5:
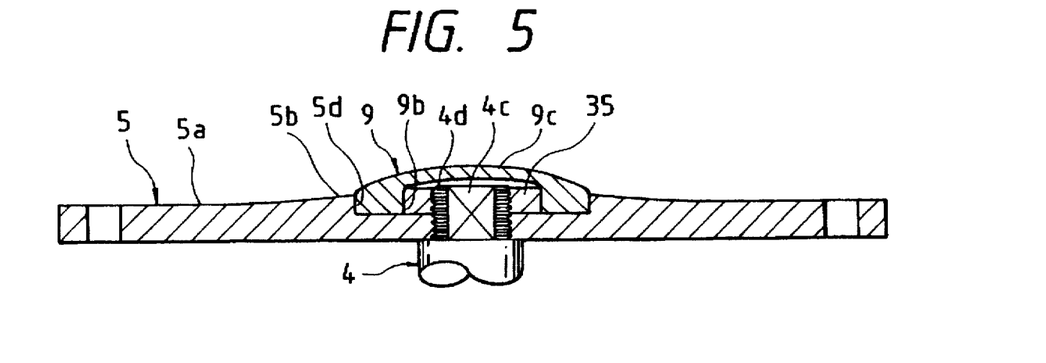
FIG. 5 is a sectional side view of a handle portion of a fishing reel according to a second embodiment of the invention.

FIG. 5 is a view of a handle portion of a second embodiment of the invention. In the second embodiment, a loosening preventive member 9 is pressure-fitted into and fixed to an elliptical recessed portion 5d of a handle 5. The upper surface of the loosening preventive member 9, similarly to the previously described embodiment, is formed in a curved surface 9c which provides a smooth surface from the peripheral edge portion thereof to the central portion thereof. In the second embodiment, as shown in FIG. 5, the curved surface 9c is not level with a curved surface 5b of the handle 5 but expands slightly outwardly. Such structure can also provide a similar effect to the above-mentioned embodiment. Also, since no screw or the like is used as a securing part, fixing of the loosening preventive member 9 to the handle upper surface is easy and entrance of a bait, dust and the like into the securing part can also be prevented.

Figure 6:
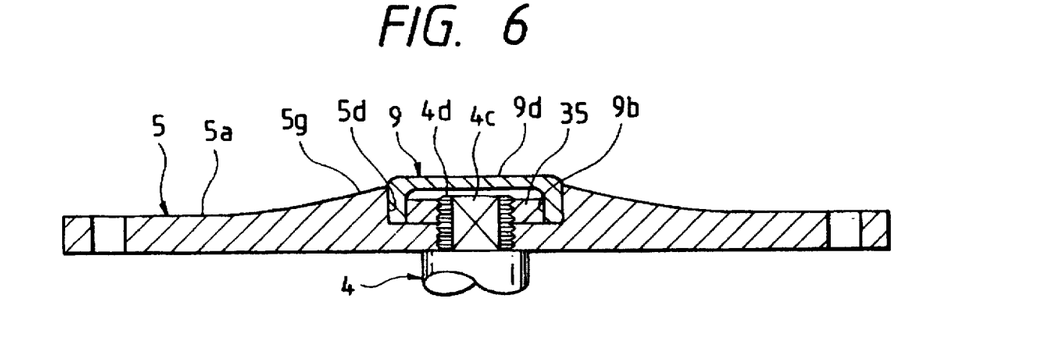
FIG. 6 is a sectional side view of a handle portion of a fishing reel according to a third embodiment of the invention.

Now, FIG. 6 is a view of a third embodiment of the invention. In the third embodiment, a loosening preventive member 9 is pressure-fitted into and fixed to an elliptical recessed portion 5d of the handle 5. The upper surface of the loosening preventive member 9 is formed in a smooth horizontal surface 9d. This structure can also provide a similar effect to the above-mentioned second embodiment.

Figure 7:
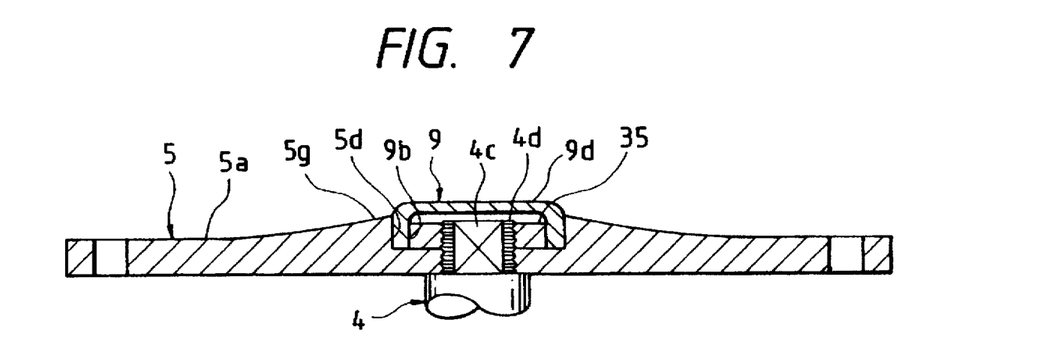
FIG. 7 is a sectional side view of a handle portion of a fishing reel according to a fourth embodiment of the invention.

FIG. 7 is a view of a fourth embodiment of the invention. In the fourth embodiment, a loosening preventive member 9 is pressure-fitted into and fixed to an elliptical recessed portion 5d of the handle 5, and the upper surface of the loosening preventive member 9 is formed in a smooth horizontal surface 9d. In the fourth embodiment, the central curved surface 5g of the handle 5 is formed lower than one in the above-mentioned third embodiment. However, even when a stepped portion of this level exists between the upper surface 5a of the handle 5 and the upper surface of the loosening preventive member 9, the curved surface 5g and the smooth horizontal surface 9d can prevent the fishline from getting twined effectively. Also, more preferably, although not shown, if no curved surface is formed on the upper surface 5a of the handle 5 but the upper surface 5a is formed in a horizontal surface, and a loosening preventive member 9 including a horizontal surface 9d is fitted into the recessed portion 5d of the handle 5 to thereby make the handle 5 and loosening preventive member 9 level with each other, then the fishline and the like cannot be caught at all.

Figure 8:
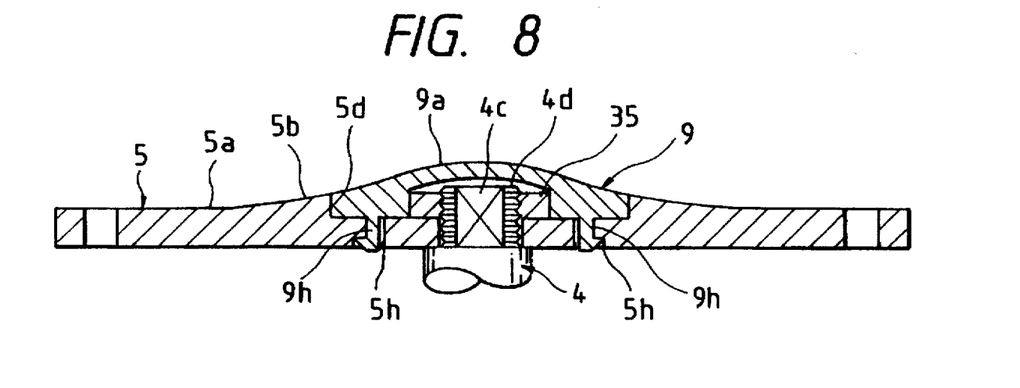
FIG. 8 is a sectional side view of a handle portion of a fishing reel according to a fifth embodiment of the invention.

Now, FIG. 8 is a view of a fifth embodiment according to the invention. In the fifth embodiment, it is easier to fix a loosening preventive member 9 to the upper surface of a handle 5. A through hole 5h is formed in the recessed portion 5d of the handle 5 and also, on the back side of the loosening preventive member 9, there is formed an elastically deformable elastic securing portion 9h which is to be inserted into the through hole 5h. According to this structure, the loosening preventive member 9 can be fixed to the handle 5 by one-touch operation and, if the elastic securing portion 9h is held or picked from the lower surface side of the handle 5, then the loosening preventive member 9 can be removed easily. Also, there is eliminated the need to provide an exposed securing portion using a set screw on the surface portion of the loosening preventive member 9 and thus there is no possibility that a bait, dust and the like can stick to the surface portion of the loosening preventive member 9.

Figure 9:
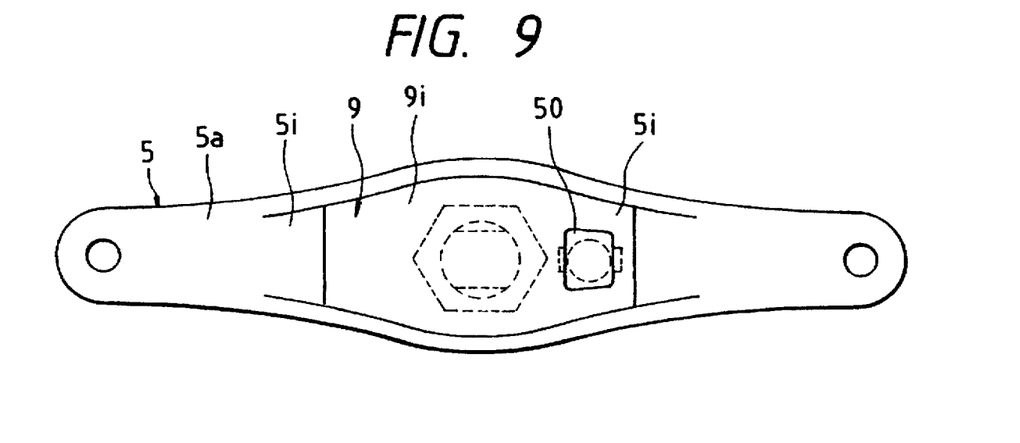
FIG. 9 is a plan view of a handle portion of a fishing reel according to a sixth embodiment of the invention.
Figure 10:
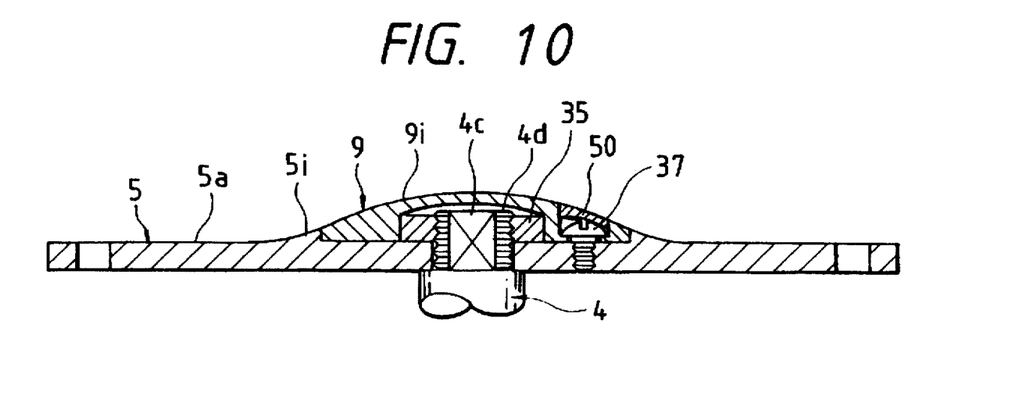
FIG. 10 is a sectional side view of the handle portion shown in FIG. 9.

Now, in FIGS. 9 and 10, there is shown a sixth embodiment according to the invention. In particular, FIG. 9 is a plan view of a handle portion of the sixth embodiment and FIG. 10 is a sectional side view of the handle portion shown in FIG. 9. Although in each of the previously described embodiments the recessed portion 5d is formed on the upper surface of the handle 5 and the loosening preventive member 9 is fitted into the recessed portion 5d, as in the present or sixth embodiment, when a curved-surface-shaped projected portion 5i is formed in the neighborhood of the drive shaft mounting portion of the upper surface 5a of the handle 5 and a loosening preventive member 9 having a smooth curved surface 9i continuing with the curved surface of the projected portion 5i, then a similar effect can be obtained. Also, if an elastically deformable cap 50 for covering the head portion of a set screw 37 is removably mounted on the loosening preventive member 9, then the set screw 37 is not be exposed and thus a bait, dust and the like are prevented from sticking to the head portion of the set screw 37.

Figure 11:
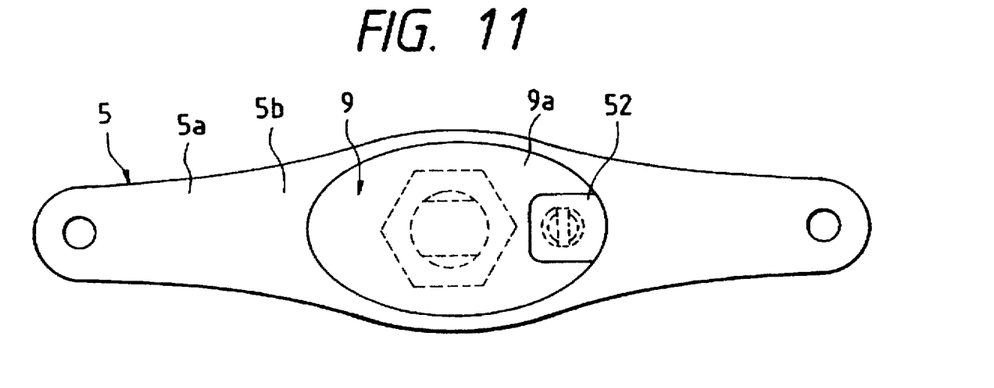
FIG. 11 is a plan view of a handle portion of a fishing reel according to a seventh embodiment of the invention.
Figure 12:
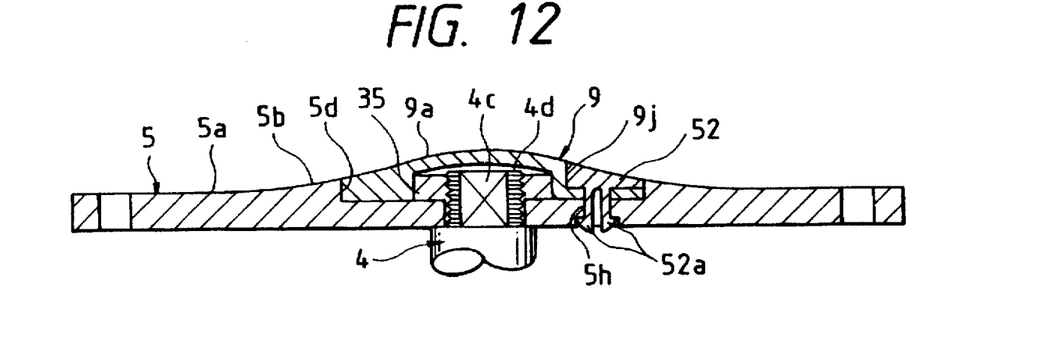
FIG. 12 is a sectional side view of the handle portion shown in FIG. 11.

Now, FIGS. 11 and 12 are views which respectively show a seventh embodiment of the invention. In particular, FIG. 11 is a plan view of a handle portion of the seventh embodiment, while FIG. 12 is a sectional side view of the handle portion shown in FIG. 11. According to the seventh embodiment, a loosening preventive member 9 can be fixed to a handle 5 without using a set screw. In part of the loosening preventive member 9, there is formed a cutaway portion 9j which includes a through hole adapted to be in communication with a through hole 5h formed in the handle 5 and, to the cutaway portion 9j, is fitted a securing member 52 which is level with a smooth curved surface 9a. The securing member 52 includes a pair of elastically deformable leg potions 52a which are to be inserted into the through hole formed in the cutaway portion 9j and into the through hole 5h formed in the handle 5, so that the leg portions 52a allow the securing member 52 to be secured to the lower surface of the handle 5. Due to this structure, according to the seventh embodiment, similarly to the above-mentioned fifth embodiment, the loosening preventive member 9 can be fixed to the upper surface of the handle 5 by one-touch operation and the loosening preventive member 9 can be removed easily by holding or picking the leg portions 52 from the lower surface side of the handle 5.

Figure 13:
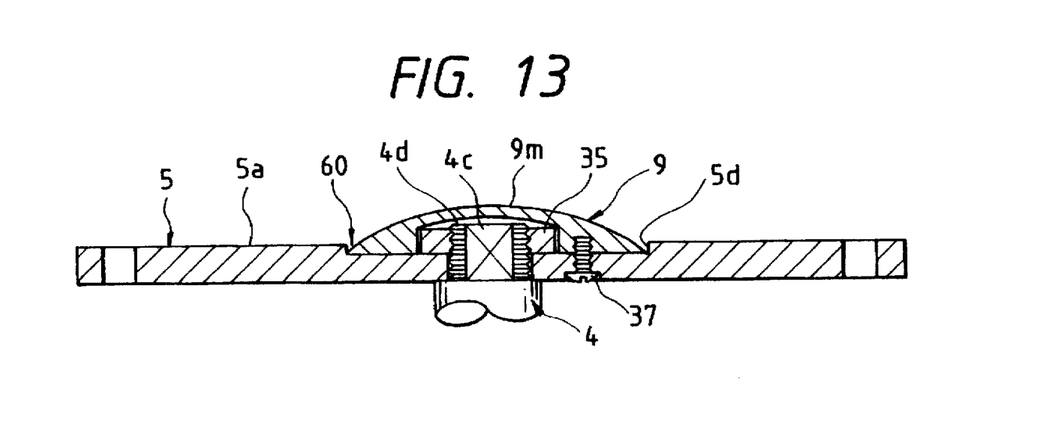
FIG. 13 is a sectional side view of a handle portion of a fishing reel according to an eighth embodiment of the invention.

Now, FIG. 13 is a view of an eighth embodiment according to the invention. In the eighth embodiment, a loosening preventive member 9 including a smooth curved surface 9m extending from the peripheral edge portions of the member 9m to the central portion thereof is fitted deeply into a recessed portion 5d formed in an upper surface of the handle 5 and the loosening preventive member 9 is then fixed there from the lower surface side of the handle 5 by use of a set screw 37. Due to this, as shown by reference character 60 in FIG. 13, there are produced a stepped portion in the peripheral edge portion of the loosening preventive member 9 with respect to the upper surface 5a of the handle 5. However, even when such stepped portion is produced, a fishline is able to slide from the upper surface 5a of the handle 5 along the smooth surface 9m so that the fishline is prevented from getting twined around the loosening preventive member 9.

Figure 14:
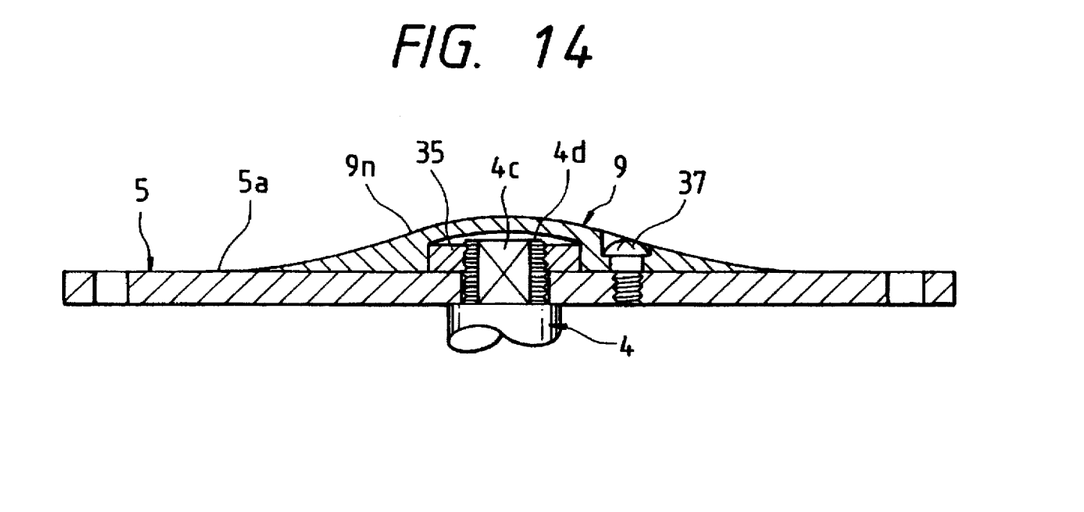
FIG. 14 is a sectional side view of a handle portion of a fishing reel according to a ninth embodiment of the invention.

FIG. 14 is a view of a ninth embodiment according to the invention. In the ninth embodiment, without forming any recessed or projected portion on the upper surface 5a of a handle 5, a loosening preventive member 9 including a smoothly curved surface 9n extending from the peripheral edge portion of the member 9 to the central portion thereof is fixed to the upper surface 5a of the handle 5 by a set screw 37. The peripheral portion of the loosening preventive member 9 is respectively formed very thin so that no stepped portion is produced with respect to the upper surface 5a of the handle 5. This structure eliminates the need to form any recessed or projected portion on the upper surface 5a of the handle 5.

Figure 15:
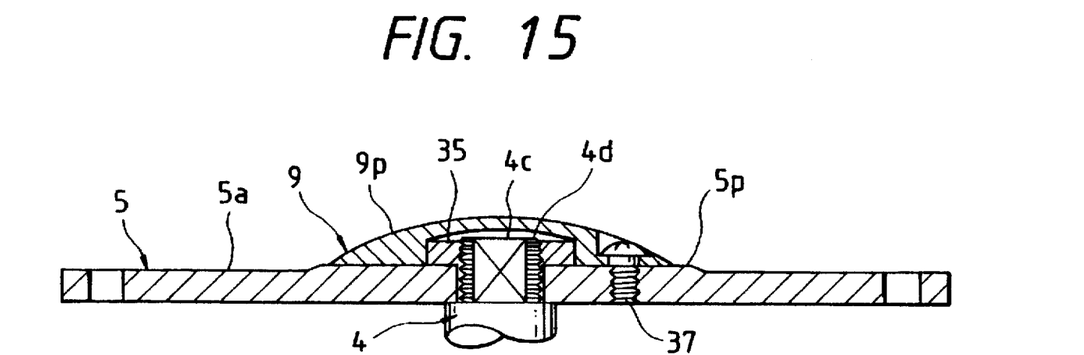
FIG. 15 is a sectional side view of a handle portion of a fishing reel according to a tenth embodiment of the invention.

Now, FIG. 15 is a view of a tenth embodiment according to the invention. In the tenth embodiment, a relatively high surface 5p parallel to the upper surface 5a of the handle 5 is provided in the portion of the handle 5 that is located in the mounting portion to the drive shaft, and a loosening preventive member 9 including a smoothly curved surface 9p extending from the peripheral edge portions of the member 9 to the central portion thereof is fixed to the high surface 5p by a set screw 37. This structure can also prevent the fishline from getting twined around the member 9.

Figure 16:
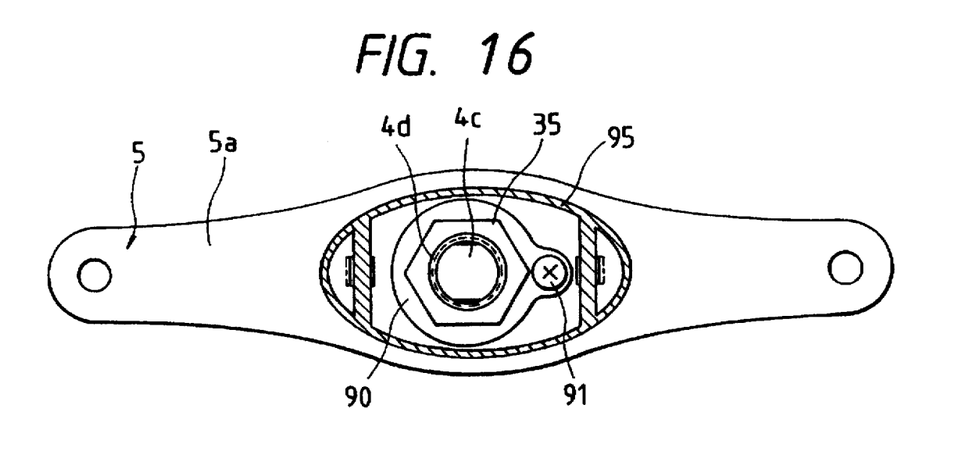
FIG. 16 is a plan view of a handle portion of a fishing reel according to an eleventh embodiment of the invention, in which a cover member mounted to the handle portion is cut away.
Figure 17:
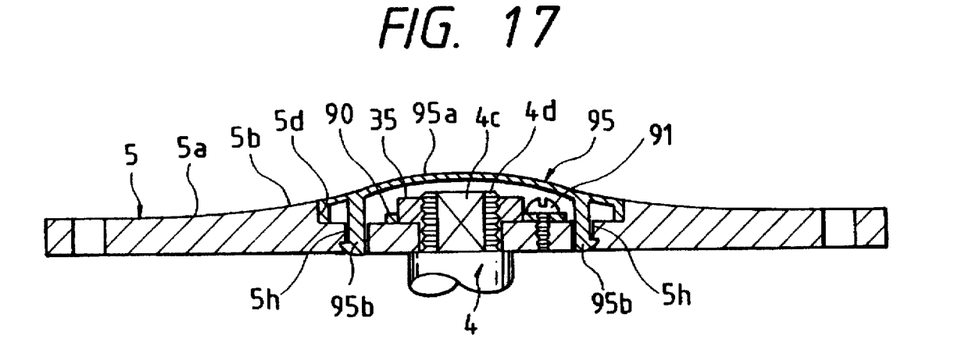
FIG. 17 is a sectional side view of the handle portion shown in FIG. 16.

FIGS. 16 and 17 respectively show an eleventh embodiment according to the invention. In particular, FIG. 16 is a plan view of a handle portion of a fishing reel, in which a cover member mounted to a handle 5 is cut away, and FIG. 17 is a sectional side view of the above handle portion. In the eleventh embodiment, a threaded member 35 is prevented from loosening by a loosening preventive member 90 screwed to the upper surface of the handle 5 by a screw 91. And, the threaded member 35 and loosening preventive member 90 are covered with a cover member 95 including a curved surface 95a which is continuously level with a curved surface 5b formed in the upper surface 5a of the handle 5. That is, the cover member 95 used in the eleventh embodiment is a member which is used to protect the handle mounting portion of the fishing reel and does not have a function to prevent the threaded member 35 from loosening. The cover member 95, for example, as in the above-mentioned fifth embodiment, is removably fixed to the upper surface of the handle 5. With use of this structure as well, in the handle mounting portion, during the winding operation of the handle, there is no possibility that the fingers can be damaged even if they accidentally touch the loosening preventive member 90, and it is possible to prevent a bait, dust and the like from sticking to the member 90, so that a fishline is prevented from getting twined around the member 90. Further, the portion for preventing the loosening of the threaded member 35 can be protected against shocks produced when it drops down or given by other things as well as against external forces.

Figure 18:
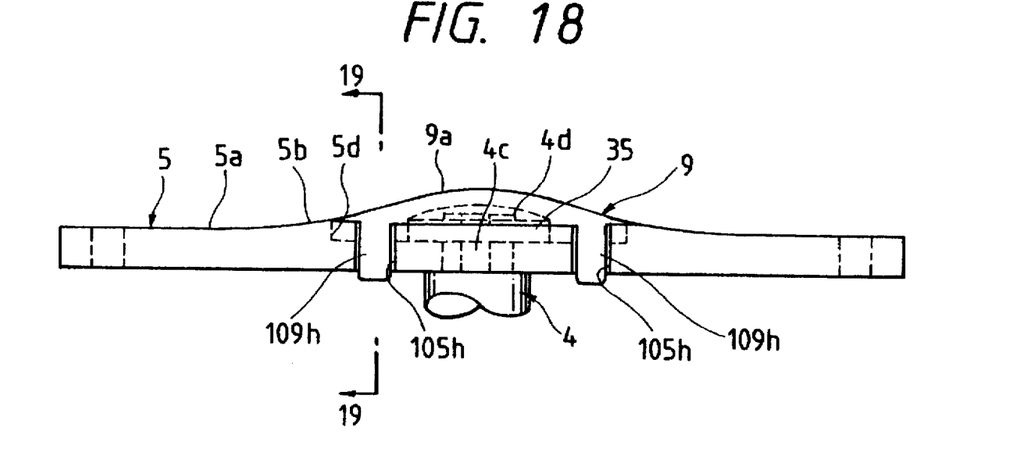
FIG. 18 is a side view of a handle portion of a fishing reel according to a twelfth embodiment of the invention.
Figure 19:
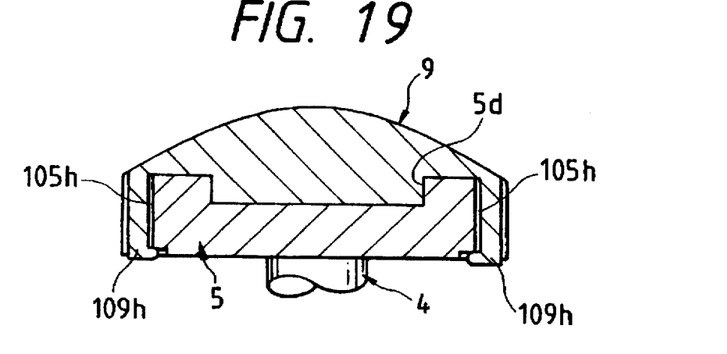
FIG. 19 is a sectional view taken along line 19—19 of FIG. 18.
Figure 20:
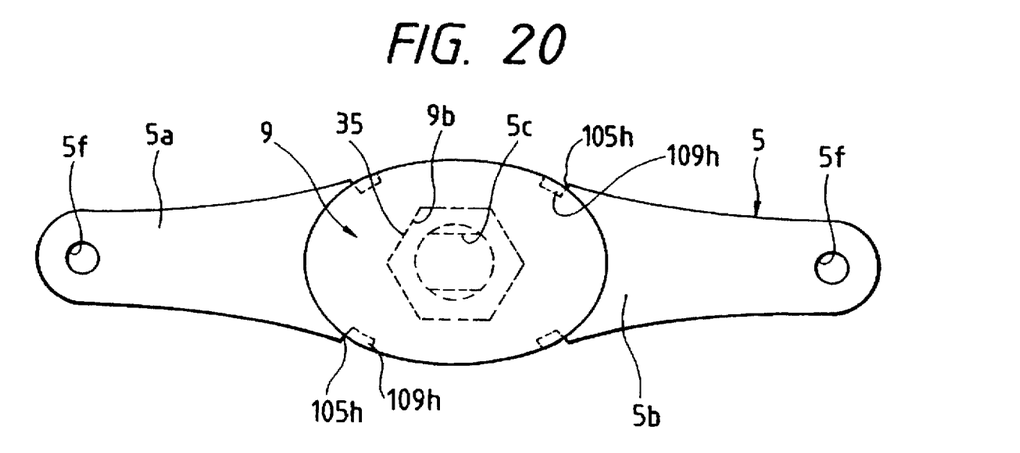
FIG. 20 is a plan view of the handle portion shown in FIG. 18.

FIGS. 18 to 20 show a twelfth embodiment of the invention. In the fifth and eleventh embodiments, the loosening preventive member 9 or the cover member 95 is elastically fixed to the handle 5 with the use of the combination of the elastic securing portion 9h or 95b and the through hole 5h. In stead of this arrangement, the twelfth embodiment employs the engagement between an elastic securing member 109h formed on the back surface of the peripheral portion of the loosening preventive member 9 and an engagement groove 105h formed in the peripheral portion of the handle 5. In this embodiment, four pairs of securing members 109h and the engagement grooves 105h in order to elastically retain the loosening preventive member 9 onto the handle 5 as best shown in FIG. 20. Although the loosening preventive member 9 of this embodiment is designed as being relatively larger in size in comparison with the loosening preventive member 9 of the fifth embodiment because of the provision of the securing portion 109h at the peripheral portion thereof, the outer surface of the loosening preventive member 9 and the curved surface 5b of the handle 5 cooperatively define a smooth outer surface which provides the same advantages or effects as those produced by the afore-mentioned embodiments. In addition, the arrangement of the twelfth embodiment that the elastic securing member 109h is formed on the peripheral portion and the engagement groove 105h is also formed in the peripheral portion to correspond to the securing portion 109h, can also be applicable to the mounting arrangement of the cover member 95 onto the handle 5 as in the eleventh embodiment.

Although the embodiments of the invention have been described heretofore, the invention is not limited to the above-mentioned embodiments but, for example, as will be described below, various changes are possible. In the above-mentioned respective embodiments, the methods for mounting the loosening preventive member 9 (or cover member 95) to the handle 5, and the shapes of the handle 5 and loosening preventive member 9 (cover member 95) can be combined with those of another embodiment arbitrarily. Although the threaded member 35 has been described that it is made up of a nut, it may be of a threaded member with a head portion and may be threadedly engaged with a female thread portion to be formed in the drive shaft 4. In the description of the above-mentioned embodiments, as the fishing reel, a dual bearing type reel is used. However, the invention can also apply to other types of reels similarly. In the illustrated embodiments, the loosening preventive member 9, recessed portion 5d and the like are respectively formed in an elliptical shape. However, this is not limitative but other shapes can also employed. Also, the shapes of the respective members used to prevent the rotation and loosening of the handle 5 or to fasten the handle 5 can also be changed variously.

According to the fishing reel of the invention, since the loosening preventive member, when being mounted and fixed to the handle, forms a smooth outer surface in cooperation with an upper surface of the handle, or since the loosening preventive member is covered with a cover member which forms a smooth outer surface in cooperation with the upper surface of the handle, when fingers may slip off the handle knob, even if the fingers accidentally touch the neighboring portion of the loosening preventive member, the fingers can be protected against damage, so that a safe and smooth winding operation is possible, and the fishline is prevented from getting twined around the loosening preventive member. Also, the invention prevents the slime of fish, bait, dust and the like from sticking to the loosening preventive member as much as possible and thus allows pleasant fishing. Further, since the handle and loosening preventive member provide a smoothly matched shape as a whole, the invention is improved in design as well.

What is claimed is:

1. A handle fixing structure for fixing a handle onto a drive shaft of a fishing reel, said structure comprising;

a threaded member for threadingly fixing said handle onto an end of said drive shaft;

a loosening preventive member mounted onto an upper surface of said handle for preventing said threaded member from loosening; and at least one elastically deformable member for fixing said loosening preventive member onto said handle;

wherein said at least one elastically deformable member is homogeneously formed as a unitary body with said loosening preventive member.

2. A structure as set forth in claim 1, wherein said at least one elastically deformable member elastically deforms to engage a through hole formed in said handle thereby providing a one-touch attachment of said loosening preventive member to said handle.

3. A structure as set forth in claim 2 wherein said elastically deformable member comprises:

a securing portion extending from said elastically deformable member having a widened portion disposed on a distal end thereon, said securing portion adapted to elastically deform to allow said widened portion to penetrate said through hole of handle and thereafter relaxing to enable said widened portion to engage said handle thereby providing a positive connection between said loosening preventive member and said handle.

4. A handle fixing structure according to claim 1, wherein said at least one elastically deformable member comprises a peripheral cylindrical portion extending from said loosening preventive member.

5. A handle fixing structure according to claim 4, wherein said peripheral cylindrical portion is disposed within a recess of said handle providing a pressure fit therewithin.

6. A handle fixing structure according to claim 5, wherein said peripheral cylindrical portion is disposed about said threaded member.

7. A handle fixing structure for fixing a handle onto a drive shaft of a fishing reel, said structure comprising;

a threaded member for threadingly fixing said handle onto an end of said drive shaft;

a loosening preventive member mounted onto an upper surface of said handle for preventing said threaded member from loosening; and at least one elastically deformable member for fixing said loosening preventive member onto said handle;

wherein said at least one elastically deformable member is integral with said loosening preventive member and each of said at least one deformable member is elastically engaged with an engagement groove formed in a peripheral portion of said handle.

* * * * *